Patented June 5, 1951  2,555,796

UNITED STATES PATENT OFFICE 2,555,796

SOIL FUMIGANT COMPRISING FUMARIC DINITRILE

Robert L. Krause, Avondale, Pa., assignor to E. I. du Pont de Nemours & Company, Wilmington, Del., a corporation of Delaware No Drawing. Application December 2, 1947, Serial No. 789,340

6 Claims. (Cl. 167—22)

This invention relates to soil fumigant compositions and methods employing fumaric dinitrile as the essential toxic ingredient. More specifically, the invention relates to soil fumigant compositions containing fumaric dinitrile in admixture with a finely divided solid or in aqueous emulsion.

It is an object of this invention to provide compositions particularly suited for fumigating and disinfecting soils infested with parasitic fungi and nematodes. Other objects will become apparent hereinafter.

The foregoing and other objects of the invention are attained by means of compositions containing fumaric dinitrile as an essential active ingredient in combination with a finely divided solid or diluent powder, or in admixture with a wetting, dispersing or emulsifying agent in an aqueous emulsion, and by methods in which fumaric dinitrile is applied to soil.

Fumaric dinitrile is a white crystalline solid. Its melting point is 95.8–96.2° C. and its boiling point is 186° C. at atmospheric pressure. The compound is prepared by treating the diamide of fumaric acid with phosphorous pentoxide or by the reaction of trans-diiodoethylene with cuprous cyanide in the presence of a suitable catalyst such as a tertiary amine.

The dust compositions of the invention are prepared by mixing fumaric dinitrile with a finely divided solid or inert powdered carrier such as fuller's earth, talc, pyrophyllite, diatomaceous earth or flours such as walnut shell flour, wheat, redwood, and soya bean flour.

The mixing of the fumaric dinitrile with the finely divided solid may be a simple mixing of finely divided solid fumaric dinitrile with the solid carrier, or, alternatively, molten fumaric dinitrile may be added slowly to the finely divided solid while keeping the solid agitated. Compatible soil conditioning and fertilizing materials may be included in the dust compositions of the invention.

The concentration of fumaric dinitrile in the dust compositions of the invention may be varied widely depending upon the manner in which the composition is to be applied and the use for which the soil is intended. Generally the dust compositions will contain from 10 to 90 per cent fumaric dinitrile the remainder being solid inert carrier.

Water-dispersible dust compositions are prepared by incorporating into the dust described above a wetting and dispersing or emulsifying agent.

In preparing the aqueous emulsion compositions of the invention, fumaric dinitrile is dissolved in a suitable solvent preferably a water-immiscible solvent such as benzene, kerosene, or other hydrocarbon solvents and this solution along with a wetting and dispersing or emulsifying agent is thoroughly stirred into water. It is preferred that the amount of solvent used in the preparation of the aqueous emulsions be kept to a minimum because of the known tendency of certain solvents to act as phytocides.

The wetting and dispersing or emulsifying agents used in preparing the aqueous emulsions and water-dispersible powders of the invention are of the type conventionally used in preparing pest control compositions. Examples of suitable adjuvants of this kind are those referred to in U. S. Patent 2,426,417 and also those listed in detail in Bulletin E-607 of the Bureau of Entomology and Plant Quarantine of the U. S. Department of Agriculture.

The dust compositions of the invention may be applied to the soil in various manners. For example, the dust may be broadcast over the soil and then incorporated into the upper layer of the soil by means of a harrow or a disc. It is also suitably applied by means of a seed planting drill.

The aqueous emulsion compositions of the invention are readily applied by spraying them over the soil to be treated. The soil, so treated, may then be later turned in and mixed with the upper layer of soil using a harrow or a disc. The aqueous emulsions may also be applied by the spot-injection method using the conventional, mechanical or hand soil fumigant applicator. In this latter method, the applicator is adjusted so that it punches holes in the ground to the desired depth and at predetermined intervals and permits a quantity of the aqueous emulsion to be deposited in each of the holes. The emulsions may also be applied by mixing them with the irrigation water or running them into a furrow after plowing.

The fumaric dinitrile compositions of the invention are applied to the soil at the rate of 80 to 300 pounds of the active toxicant fumaric dinitrile per acre and still more preferably from 150 to 250 pounds of the active toxicant fumaric dinitrile per acre.

The following examples illustrate compositions and methods of the invention:

Example I

Crystalline fumaric dinitrile and fuller's earth in the proportions of 25 pounds of the fumaric dinitrile for each 100 pounds of fuller's earth are charged into and mixed in a ribbon blender. The mixture so obtained is passed thru a hammer mill in order to obtain an intimately mixed and finely ground dust having an average particle size less than 50 microns.

A field to be planted with beets is dusted with the composition of this example at the rate of 750 pounds of the composition per acre (150 pounds of the active toxicant fumaric dinitrile per acre). The field is subsequently plowed and harrowed to incorporate the fumaric dinitrile composition.

The composition is extremely effective in combating fungi and nematodes in the soil and there results a markedly better stand of the beets and less damping off of the young plants than in untreated soil.

*Example II*

Fumaric dinitrile and a proprietary emulsifying agent containing the compound diethyl cyclohexylamine dodecyl sulfate as its essential active ingredient are dissolved in benzene in the proportions of 5 pounds of the fumaric dinitrile and .13 pound of the emulsifying agent for each gallon of benzene. This benzene solution is then agitated with water, the solution and the water being mixed in the proportion of 4 gallons of water for each gallon of the benzene used. There is thus obtained an aqueous emulsion containing approximately 1 pound of fumaric dinitrile per gallon of aqueous emulsion.

The aqueous emulsion of this example is easily applied to the soil by means of a mechanical soil fumigant applicator and gives excellent results in the control of nematodes and fungi.

I claim:

1. A soil fumigant composition comprising fumaric dinitrile in admixture with a material selected from the class consisting of finely divided solid and aqueous emulsion.

2. A soil fumigant composition comprising fumaric dinitrile in admixture with a finely divided solid.

3. A soil fumigant comprising an aqueous emulsion of fumaric dinitrile.

4. A method for fumigating and disinfecting soil which comprises applying to and mixing with the soil a composition containing fumaric dinitrile.

5. A method for fumigating and disinfecting soil which comprises applying to and mixing with the soil a composition containing fumaric dinitrile in admixture with a finely divided solid.

6. A method for fumigating and disinfecting soil which comprises applying to and mixing with the soil a composition comprising an aqueous emulsion of fumaric dinitrile.

ROBERT L. KRAUSE.

REFERENCES CITED

The following references are of record in the file of this patent:

UNITED STATES PATENTS

| Number | Name | Date |
| --- | --- | --- |
| 2,356,075 | Migrdichian | Aug. 15, 1944 |

OTHER REFERENCES

Chemical Abstracts, vol. 6, p. 483, 1912.

McAllister et al.: J. Econ. Ent., vol. 23, No. 6, pages 907 to 922 (see particularly page 918 Comp. No. 243), Dec. 1930.